United States Patent [19]

Zirbel

[11] 4,299,856
[45] Nov. 10, 1981

[54] METHOD FOR PREPARING A SUSPENSION SALAD DRESSING OR JUICE PRODUCT

[75] Inventor: Richard Zirbel, Bedford County, Va.

[73] Assignee: Wm. B. Reily & Company, Inc., New Orleans, La.

[21] Appl. No.: 110,594

[22] Filed: Jan. 9, 1980

[51] Int. Cl.³ .............................................. A23L 1/24
[52] U.S. Cl. ................................... 426/573; 426/589; 426/650; 426/804; 426/599
[58] Field of Search .............. 426/589, 804, 573, 575, 426/602, 613, 654, 650, 599

[56] References Cited

U.S. PATENT DOCUMENTS

| | | | |
|---|---|---|---|
| 2,007,218 | 7/1935 | Seltzer | 426/582 |
| 2,916,383 | 12/1959 | Nasarebich et al. | 426/589 |
| 2,916,384 | 12/1959 | Bondi et al. | 426/589 |
| 2,935,408 | 5/1960 | Steinitz | 426/570 |
| 3,023,104 | 2/1962 | Battista | 426/589 |
| 3,108,004 | 10/1963 | Klostermann | 426/610 |
| 3,418,133 | 12/1968 | Nijhoff | 426/654 |
| 3,600,186 | 8/1971 | Mattson et al. | 426/804 |
| 3,928,252 | 12/1975 | Rigler | 426/589 |
| 4,140,808 | 2/1979 | Janson | 426/589 |
| 4,143,174 | 3/1979 | Shah et al. | 426/583 |

*Primary Examiner*—Jeanette M. Hunter
*Attorney, Agent, or Firm*—Kenyon & Kenyon

[57] ABSTRACT

A method for preparing an edible suspension product, including combining a quantity of water with a weak solution of acetic acid, adding a buffering agent to the combination to elevate its pH up to a compatibly workable level, then separately mixing particular dry ingredients together that add viscosity and flavoring to the solution, heating the solution from its ambient temperature up to a heated level, gradually adding the dry ingredients into the heating solution between a particular temperature range, simultaneously agitating the mixture during heating and while the ingredients are being added to prevent coagulation, and thereafter cooling the mixture down to ambient temperature while simultaneously stirring the mixture in its solution.

21 Claims, 2 Drawing Figures

METHOD FOR PREPARING A SUSPENSION SALAD DRESSING OR JUICE PRODUCT

BACKGROUND OF THE INVENTION

This invention relates generally to the process, and product therefrom, for a culinary product, particularly a food dressing, wherein the dry ingredients mixed into the solution are permanently suspended homogeneously throughout the same without settling.

Various compositions have been prepared in the category of various dressings, such as salad dressings, and wherein their compositions include in combination water and oil supplemented with a gum for the purpose of adding body to the dressing, while simultaneously attaining the desired low caloric content, primarily for the purpose of stimulating their sale to the weight conscious trade. For example, in the United States patent to Bondi, et al., U.S. Pat. No. 2,916,384, a combination of water, vinegar, and primarily olive oil is intermixed with various flavorings, in addition to agar gum for producing an Italian flavored simulated dressing that exhibits a low caloric content. While the dressing identified in this particular patent is reported to be a proven simulation of an Italian dressing, its use of oil within its ingredient content does increase the caloric content, and also prevents the gum added from conveniently mixing within the solution for the purpose of maintaining a desired viscosity therewith, such as to be herein taught by applicant, as such is desired for the purpose of suspending the dry ingredients throughout its solution without the need for further agitating or shaking after its being packaged. Thus, settlement does occur in the Bondi type of dressing, although said dressing probably is desirable for the purpose of acting as an Italian dressing substitute.

The U.S. Pat. No 3,418,133, to Nijhoff, discloses a low calorie edible spread composition incorporating a thickening agent for the purpose of rendering the consistency of the composition appropriate for a spread, but such a composition is not capable of being used as a pourable dressing or any other pourable type liquid wherein all of the ingredients are permanently suspended and clearly viewable within the solution, and thereby alleviating the necessity for shaking before usage. In Example 1 of this cited United States patent, the disclosed composition can also be used as a salad dressing, but the presence of oil within the solution does have a tendency to detract from the effectiveness of the thickening agent, herein identified as sodium carboxymethyl cellulose, for maintaining the solid ingredients in suspension for any lengthy period of time.

Also disclosed in the prior art is the invention of Jamison, et al., as shown in U.S. Pat. No. 4,129,663, for a pourable salad dressing composition. All of the examples of this disclosure include oil to some significant percentage to form an oil in water type of emulsion, and while the dressing described is probably effective for its purpose as a pourable composition, through experimentation the dry ingredients of the disclosed examples cannot be maintained in suspension. Other prior art patents relating to the subject matter of this disclosure are the U.S. Pat. of Seltzer, No. 2,007,218; Folkrod, No. 2,344,688; Steinitz, No. 2,935,408; Monti, et al., No. 3,042,668; Klostermann, No. 3,108,004; and Shah et al., No. 4,143,174.

SUMMARY OF THE INVENTION

The principal object of this invention is to provide a method for preparing an indefinitely sustainable suspension of insoluble ingredients in a pourable liquid food product, thereby obviating the need for agitation of the product before each use.

A further object of this invention is to provide an oil-free pourable liquid food product comprising a solution adapted for indefinitely suspending dry mix ingredients therein.

Still another object of this invention is to provide a very low calorie dressing for salads, or the like.

Yet another object of this invention is to provide a transparent edible pourable suspension solution for dry mix ingredients that maintains said ingredients permanently in suspension, thereby providing a highly attractive appearance for the product during its shelf life upon the counter while displayed for sale in the market.

Still another object of this invention is to provide a pourable light edible dressing that contains no oil but yet is sufficiently viscous so as to retain in suspension the various dry ingredients that normally add viscosity, flavoring, and appearance to the end product.

These and other objects are achieved in a method for preparing a suspension of uniformly dispersed solid particulate ingredients in a pourable liquid food product which includes the following ingredients by weight percent;

Water: 63 to 75
5% to 10% weak acetic acid solution: 12 to 25
Dextrose: 4 to 10
Salt: 1.6 to 2
Thickening agent: 0.40 to 0.67
Dry flavorings: 0.4 to 4.0

The method of the invention comprises dry blending the dextrose, salt, thickening agent, and dry flavorings together; diluting the 5% to 10% weak acetic acid solution with about half of the water; buffering the diluted solution to a pH value above 3.5; heating the buffered solution to about 88° C. (190° F.); mixing the dry blended ingredients into the heating solution while it passes through the temperature range from about 49° C. (120° F.) to about 71° C. (160° F.) while simultaneously agitating the mixture to prevent coagulation; and then cooling the mixture down to ambient temperature within approximately 1 to 2 hours by adding the other half of the water while stirring the cooling mixture.

The method of the invention is particularly applicable to the formulation of salad dressing and will become more apparent to those skilled in the art upon reviewing the summary of this invention, and upon undertaking a study of the examples of performing this process in view of the drawing.

DETAILED DESCRIPTION OF THE PREFERRED EMBODIMENTS

Figure 1:
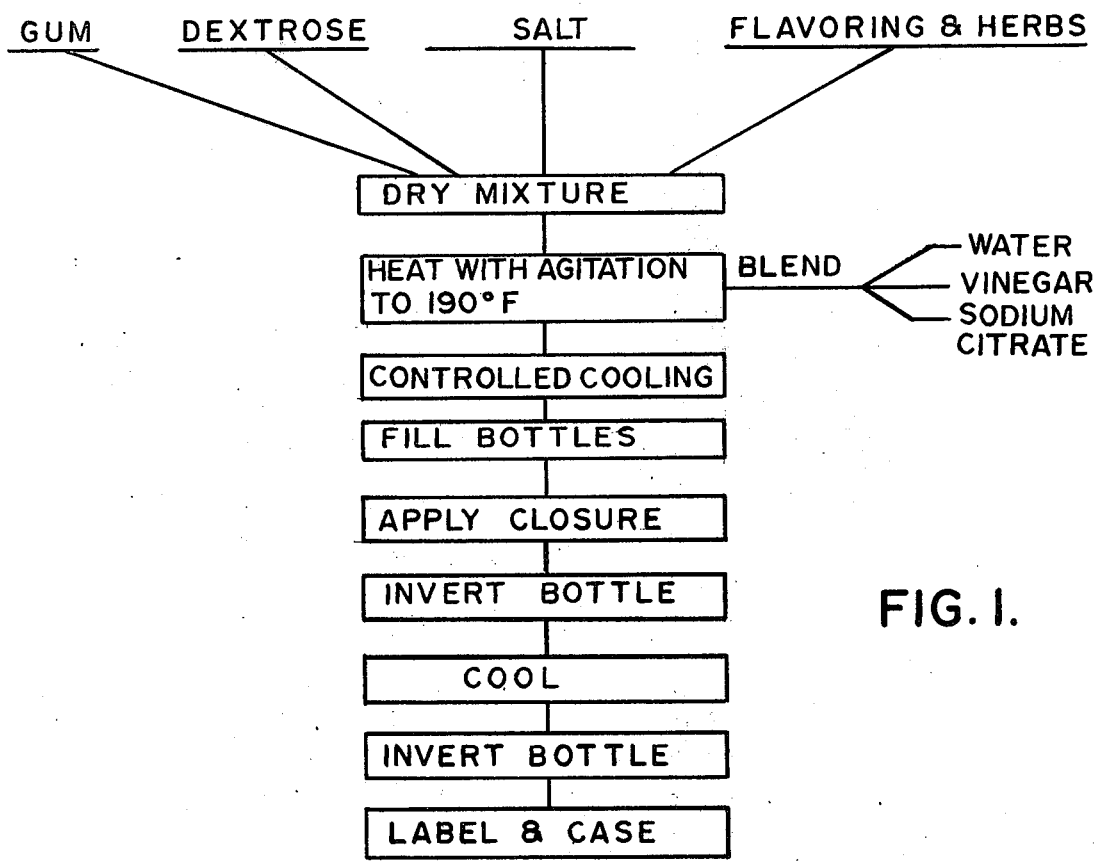
FIG. 1 is a flow diagram of the method of the invention.

This invention contemplates the formation of an oil-free low calorie pourable dressing for salads or other types of food products, and which also incorporates the ability to maintain dry mix ingredient suspension within the formed product, so that after the product has been prepared, and for any length of time thereafter, its various ingredients will remain suspended throughout the product, thereby obviating the need for vigorous shaking by the user just prior to its application, as when dispersed upon a salad, and in addition, further eliminating the usual unsightly appearance of salad dressings of this type in which the dry flavoring ingredients normally rest upon the bottom of the container. The dressing of this invention retains its dry or flavoring ingredients totally suspended within and throughout the product, and all of its ingredients remain uniformly distributed, thereby significantly adding to the pleasing appearance of the product, and also eliminating that need for vigorous and continuous shaking that must be done by the homemaker or user just prior to application of the prior art type of dressings.

Essentially, the product incorporates as a base solution a combination of water and acetic acid, a weak acetic acid being contemplated, with the further addition of a buffering agent, such as sodium citrate, so as to elevate the pH of the product to that level which prevents the acetic acid content of the product from reducing the effectiveness of a subsequently added thickening agent to attain the suspension attributes of this product when processed according to the teachings of this invention.

The various thickening agents contemplated for use in this invention include the variety of natural gums readily available upon the market, such as guar gum, locust bean gum, carrageenin in addition to the various chemically formulated thickening agents, such as carboxymethyl cellulose, and related type of agents. Various of these gums, or blends thereof, are available from Ifag Gum Company, of Leubeck, West Germany, and are normally sold under the trademark Frimulsion. Such gums are also available from its United States subsidiary, PFW, Inc., of Middleton, New York.

Regardless of which of the aforesaid gums or thickening agents are utilized, it is the method of processing these gums in solution within particular temperature and time ranges that makes the composition of this invention unique in its ability to function as a permanent suspender of the miscellaneous dry ingredients normally included within a dressing of this category. But, it is to be understood that this invention not only contemplates the formation of a suspension for salad dresssings, or related type products, but further can be used as a means for achieving a more permanent mix for other types of food products having a pulpy content which normally settles to the bottom of the container in which the product is packaged. For example, the various fruit juices available upon the market, such as orange, pineapple, tomato, or the like, and furthermore the various fruit dressings or other types of salad dressings, such as the Russian style of dressing, which contain a significant quantity of bulky component, may be adaptable for processing in accordance with the teachings of this invention so as to attain a more permanent suspension of solid ingredients, or pulpy content, throughout the juice or dressing solution. The preparation of various dressings in accordance with the teachings of this invention can be further tailored through the addition of other flavoring, coloring, or other type of added ingredients, and which have been found not to act deleteriously upon the composed product in which such additives are included. Hence suspension of the dry ingredients, if properly mixed in accordance with the teachings of this invention, remain permanently, while added ingredients, unless they are significantly acidic, do not have a tendency to break down the viscosity and assure its ability to attain and retain suspension of ingredients within the mixture even after prolonged storage.

EXAMPLE 1

An example of this process follows. The end product will include water in an amount equivalent to between about 63% to 75% by weight of the total amount of ingredients. Initially, only about one-half of the total amount of water required is added to a 5% to 10% weak acetic acid solution, preferably vinegar, in an amount between about 12% to 25% by weight of the total ingredients. To the same a buffering agent, such as sodium citrate, is added until the pH of the mixture reaches approximately 3.8, and at least 3.5.

After performance of the foregoing, the following dry ingredients are dry blended. These include about 4% to 10% by weight of a sweetening agent, such as dextrose, 1.6% to 2% by weight of salt, and one of the thickening agents, as previously explained, and preferably one of the gums, in an amount of between about 0.40% to 0.67% by weight, of the total ingredients. Various dry flavorings, such as seasonings, are added in an amount of between about 0.4% to 4.0% into the mixture with sorbic acid in an amount of about 0.1% for preservative purposes, and all of these ingredients are then dry blended into a thoroughly mixed composition. At this point, and as can be seen from the chart in FIG. 1, the previously diluted acetic acid solution is heated, so that its temperature commences to rise from ambient towards a final temperature, somewhere in the vicinity of 190° to 200° F. (88° to 93° C.). After the solution attains a temperature of at least 120° F. (49° C.), the dry ingredient mixture is gradually added into the solution, while agitating the mixture by a bottom disposed propeller in the solution container that upon rotation creates a mild vortex in the solution; so that the dry mixture will thoroughly disperse throughout the agitated solution. It will be recalled that within the dry mixture, one of the ingredients was the thickening agent, such as the gum, and it has been found that the dry mixture containing this ingredient should not be added to the solution before it attains 120° F. If the dry mix is added at a lower temperature, such as within the 80° up to 90° F. (27° to 32° C.) range, great difficulty is encountered in getting such components to properly disperse throughout the solution. Through experimentation, adding the dry mix at those temperatures resulted in a substantial quantity of the ingredients forming a residue at the bottom of the mixing vessel. Conversely, such dry mix ingredients must be added to the solution before it attains a temperature of 160° F. (71° C.) to dissolve the thickening agent properly and cause the solution to thicken to a viscosity preferably within a range of 275 to 325 centipoises, and at this degree of viscosity to achieve a suspension of all of the insoluble dry mix ingredients thoroughly dispersed throughout the solution.

If any of the dry mixture components include pieces of vegetable as insoluble seasonings, such as chives, it is desirable to blanch such components before their addition to the solution in order to prevent the occurrence of detrimental enzyme activity, which could break down the necessary enhanced viscosity of the solution.

After the dry ingredients have been thoroughly mixed into the solution, before it attains a temperature of 160° F., heating of the mixture continues until a temperature within the range of 190° F. to 200° F. is achieved. As mentioned above, it has been found that the dry mixture, including the thickening agents, could not be added above 160° F., for example around 180° F., without the occurrence of severe lumping of the dry mix ingredients. It is believed that the swelling of the thickening agent is accelerated at higher temperatures, thereby causing the gums on the outside of any coagulated mass to rapidly take up water and thereby encapsulate the mixture and prevent water from reaching the inside of any such mass. Further severe agitation may partially break up any such wet lump of dry mix, but the product attained is yet still very unsatisfactory both in appearance and taste.

After being heated to a temperature in the vicinity of 190° F. to 200° F., the mixture is then cooled by the addition of cold water into a jacket surrounding the mixing vessel, preferably water within the vicinity of 40° F. to 50° F., down to ambient temperature in approximately 90 minutes. At the same time, the other half of the water, commercially sterile water being preferred, at a temperature also between about 40° to 50° F., is added into the mixture to dilute it down to final strength and to accelerate the cooling of the solution within the designated time span.

It has been found that to allow the product to cool naturally, which normally takes approximately 3 hours, separation occurs, with the gums apparently breaking down in their function to maintain the viscosity of the solution and resultant homogeneous suspension of the insoluble ingredients. As a practical matter, cooling times between one to two hours have been found reasonably effective, although in duration has as the cooling time approaches two hours in duration, a measurable decrease in the product's viscosity results.

In addition, it has also been discovered that to continue the agitation through the use of the bottom disposed propeller causes a break down in viscosity, but that some stirring must be continued. Incorporating a side swept type of mild agitation or stirring for the solution during this cool down and dilution period has been most effective for attaining uniform dispersion of the insoluble ingredients uniformly throughout the suspension. After completion of the foregoing process, these insoluble ingredients remain uniformly suspended for many months of shelf life and during subsequent consumption.

FIG. 1 is a chart showing the steps of one example of this process, with the dry mixture being blended through agitation and heat with the water, vinegar and a buffering agent, the heated mixture then being subjected to the controlled cool down as just explained. Following this, in an assembly line operation for preparing this oil-free dressing, bottles are then filled, a closure and a label are applied, and the bottles are placed into a case for shipment.

Figure 2:
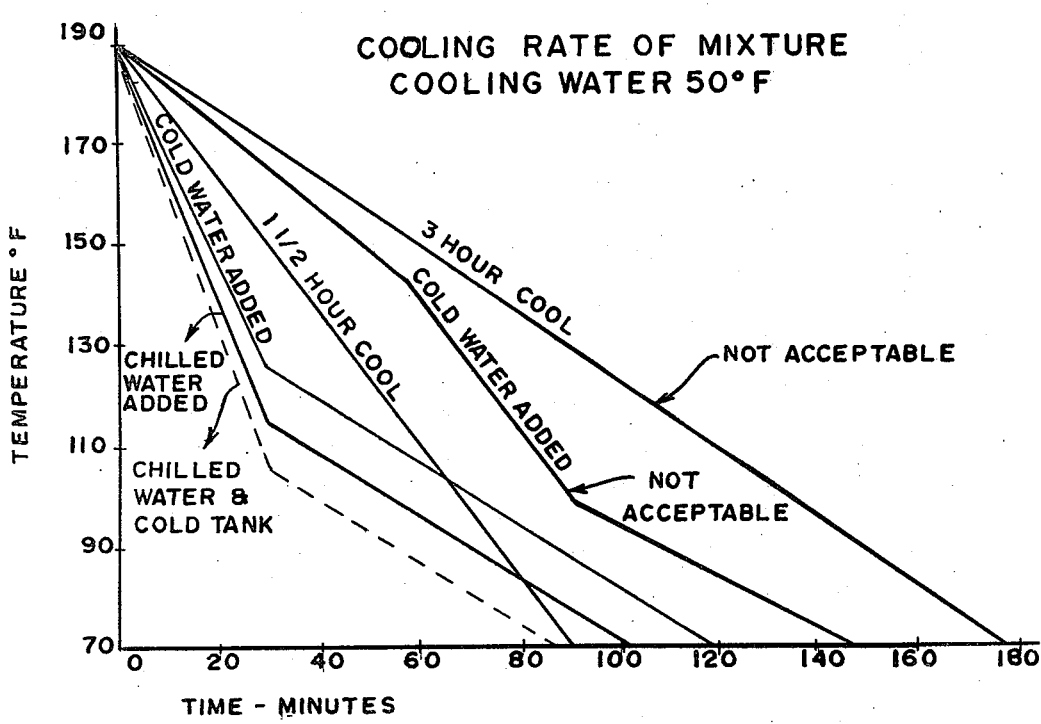
FIG. 2 is a graph of temperature versus time showing the acceptable cooling rate limits of the method of the invention.

FIG. 2 is a chart showing that a steady controlled cool down by flowing cold water continuously through the vessel jacket and adding the other half of the water to the mixture in the vessel, together; with side swept agitation, for a one and a half hour cool down is most satisfactory.

As previously alluded to, the process of this invention can also be used for preparing other types of food products, such as various juices, or other types of dressings. Under this procedure, water in an amount of between about one-half of the 62% to 75% by weight of the final product is combined with concentrated solids, such as the pulp of various fruits or vegetables, such as oranges, grapefruit, tomatoes, or the like, with the latter being included in a range of between about 12% to 25% by weight of the final product. Thereafter the solution is heated from its ambient temperature up to approximately 190° F., while a thickening agent, such as carboxymethylcellulose or one of the gums, is added in an amount between about 0.4% to 0.67% by weight into the heating solution in a temperature range of between about 120° F. to 160° F. The mixture is agitated while being heated, until it reaches a temperature in the vicinity of 190° F., and thereafter, the agitation is converted to a side swept type of stirring, within the vessel, and the product is cooled down by circulating chilled water through a jacket surrounding the vessel and adding the other half of the water into the vessel, to reach the final strength of the product and to drop the temperature of the mixture down to ambient within 1.5 hours.

Various other mixtures for the oil-free pourable suspended solids dressings have been formulated, and the following examples indicate the ingredient content for such formulations. The method as previously described for Example 1 is used, and in each case a uniform suspension of insoluble ingredients dispersed homogeneously throughout the solution for a prolonged period of time is obtained.

It has been found that the addition of a sorbic acid into the dry ingredients before they are blended into the solution effectively extends the shelf life of the product. Alternatively, potassium sorbate or any other available preservative, can be used for the same purpose, to act as a microbiological inhibitor and prevent the growth of bacteria, yeast, or mold.

EXAMPLE 2

| Light Salad Dressing | |
|---|---|
| | % |
| Water, Deionized | 73.64 |
| Vinegar, White 100 Grain | 12.50 |
| Dextrose | 8.0 |
| Sodium Citrate (25% Solution) | 2.83 |
| Salt | 1.80 |
| Frimulsion 6G | 0.45 |
| Frimulsion 10 | 0.22 |
| Chervil | 0.14 |
| White Wine Flavor | 0.28 |
| Thyme | 0.07 |
| Basil | 0.07 |

EXAMPLE 3

| Light Salad Dressing | |
|---|---|
| | % |
| Water, Deionized | 63.695 |
| Vinegar, Cider 50 Grain | 25.00 |
| Dextrose | 4.00 |
| Sodium Citrate (25% Solution) | 2.80 |
| Salt | 1.60 |
| Frimulsion 6G | 0.45 |
| Frimulsion 10 | 0.22 |
| Oregano, Soluble | 0.07 |
| Garlic, Soluble | 1.30 |
| Parsley, Soluble | 0.16 |
| Soy Sauce | 0.48 |
| Red Pepper Granule | 0.07 |
| Garlic Dehydrated Minced | 0.07 |
| Parsley | 0.015 |

| Light Salad Dressing | % |
|---|---|
| Basil | 0.07 |

EXAMPLE 4

| Light Salad Dressing | % |
|---|---|
| Water, Deionized | 71.08 |
| Vinegar, White 100 Grain | 12.5 |
| Dextrose | 8.0 |
| Sodium Citrate (25% Solution) | 2.8 |
| Salt | 1.6 |
| Frimulsion 6G | 0.45 |
| Frimulsion 10 | 0.22 |
| Onion Powder | 1.12 |
| Onion Juice | 1.12 |
| Chive, Freeze Dried | 0.42 |
| Onion, Dehydrated Minced | 0.42 |
| White Wine Flavor | 0.27 |

EXAMPLE 5

| Light Salad Dressing | % |
|---|---|
| Water, Deionized | 74.67 |
| Vinegar, White 100 Grain | 12.5 |
| Dextrose | 7.0 |
| Sodium Citrate (25% Solution) | 2.83 |
| Salt | 1.80 |
| Frimulsion 6G | 0.45 |
| Frimulsion 10 | 0.22 |
| Onion, Dehydrated Minced | 0.14 |
| Garlic, Dehydrated Minced | 0.06 |
| Pepper, Black Coarse | 0.03 |
| Parsley | 0.06 |
| Celery, Stalk Granule | 0.03 |
| Carrot Granule | 0.06 |
| Red Pepper Granule | 0.06 |
| Celery Flake | 0.06 |
| Tomato Flake | 0.03 |

EXAMPLE 6

| Light Salad Dressing | % |
|---|---|
| Water, Deionized | 73.69 |
| Vinegar, White 100 Grain | 12.50 |
| Dextrose | 7.00 |
| Sodium Citrate (25% Solution) | 3.00 |
| Salt | 1.60 |
| Frimulsion 6G | 0.45 |
| Frimulsion 10 | 0.22 |
| Dill, Soluble | 0.70 |
| Dill Weed | 0.14 |
| Red Pepper, Granule | 0.07 |
| Onion, Dehydrated Minced | 0.10 |
| Parsley | 0.02 |
| Garlic, Dehydrated Minced | 0.04 |
| Lemon Juice Concentrate | 0.47 |

EXAMPLE 7

| Light Salad Dressing | % |
|---|---|
| Water Deionized | 69.72 |
| Vinegar, White 100 Grain | 12.50 |
| Dextrose | 10.00 |
| Sodium Citrate (25% Solution) | 2.83 |
| Salt | 1.60 |
| Frimulsion 6G | 0.45 |
| Frimulsion 10 | 0.22 |
| Tarragon Soluble | 1.13 |
| Tarragon | 0.06 |
| Rosemary Soluble | 0.14 |
| Onion, Dehydrated Minced | 0.07 |
| Garlic, Dehydrated Minced | 0.03 |
| Green Pepper Powder | 1.25 |

EXAMPLE 8

| Light Salad Dressing | % |
|---|---|
| Water, Deionized | 64.15 |
| Catsup | 14.0 |
| Vinegar (white 100 grain) | 8.0 |
| Dextrose | 8.0 |
| Dehydrated Onion | 2.0 |
| Sodium Citrate (25% Sol) | 1.7 |
| Salt | 0.8 |
| Paprika | 0.4 |
| Celery Seed | 0.32 |
| Frimulsion 10 | 0.23 |
| Sorbic Acid | 0.10 |

EXAMPLE 9

| Light Salad Dressing | % |
|---|---|
| Water, Deionized | 71.45 |
| Vinegar (White 100 grain) | 6.00 |
| Dehydrated Blue Cheese | 6.00 |
| Dehydrated Sour Cream | 6.00 |
| Dextrose | 5.00 |
| Natural Flavor | 2.25 |
| Salt | 0.80 |
| Modified Food Starch | 0.30 |
| Frimulsion 10 | 0.35 |
| Frimulsion 6G | 0.25 |
| Sodium Citrate (25% Sol) | 0.10 |

Sorbic acid, or some other preservative, may be added to each of the ingredient listings for the examples 1-7 cited above, in an amount of about 0.10%, to inhibit bacterial growth. In examples 2-9, the ingredients identified by the trademarks Frimulsion 6G and Frimulsion 10 consist of a standardized blend of seaweed extract, pectin sugar, and refined natural gum and a standardized blend of refined natural gums, respectively.

Various modifications or changes to the overall process or steps in performance of the method of this invention may occur to those skilled in the art upon reviewing the subject matter of this disclosure. Such changes or modifications, if within the spirit of this invention, are intended to be encompassed by the scope of any claims to patent protection issuing hereon. The examples of the various ingredients included within the composition of products formulated under this invention are set forth for illustrative purposes only.

Having thus described the invention, what is claimed and desired to be secured by Letters Patent is:

1. A method for preparing an edible suspension wherein particulate ingredients are indefinitely suspended without the need for stirring to maintain uniform dispersion of said ingredients, said edible suspension including the following ingredients in weight percent:
   Water: 63 to 75
   5% to 10% weak acetic acid solution: 12 to 25
   Dextrose: 4 to 10
   Salt: 1.6 to 2
   Thickening agent: 0.40 to 0.67
   Dry flavorings: 0.4 to 4.0,
wherein the method comprises:
   combining about one-half of the water with the 5% and 10% weak acetic acid solution,
   adding a buffering agent to the diluted solution sufficient to elevate its pH value above 3.5,
   separately mixing and blending the dextrose, thickening agent, and dry flavorings together,
   thereafter heating the diluted and buffered acetic acid solution from ambient temperature up to approximately 88° C. (190° F.),
   gradually adding the dry ingredients into the heating solution while the solution passes through the temperature range of between about 49° C. (120° F.) to about 71° C. (160° F.),
   simultaneously agitating the mixture while heating to prevent ingredient coagulation, and
   thereafter cooling the mixture down to an ambient temperature in approximately 1 to 2 hours by adding the other half of the water while simultaneously stirring the cooling mixture.

2. The method of claim 1 and wherein the acetic acid solution is a vinegar.

3. The method of claim 1 and wherein the buffering agent is sodium citrate.

4. The method of claim 1 wherein the agitation is effected through a bottom disposed propeller.

5. The method of claim 1 wherein said stirring is effected through a swept surface operation.

6. The method of claim 1 wherein the dry flavorings include seasonings.

7. The method of claim 1 and wherein the thickening agent comprises a gum.

8. The method of claim 1 wherein the thickening agent comprises carboxymethyl cellulose.

9. The method of claim 1 wherein the thickening agent added into the mixture maintains the final solution at a viscosity of between about 275 to 325 centipoises.

10. The method of claim 9 wherein the cooling of the mixture from 190° F. down to ambient comprises adding water chilled to a temperature of between about 40° F. to 50° F. into a jacket surrounding the mixed solution.

11. The method of claim 10 and wherein the acetic acid solution is a vinegar, the buffering agent is sodium citrate, the thickening agent comprises a gum, the agitation is effected through a bottom disposed propeller, and the stirring is effected through a swept surface operation.

12. A salad dressing made by the process of claim 11 and including a mixture of the following ingredients in percentage by weight:
   Water, Deionized: 73.54
   Vinegar, White 100 Grain: 12.50
   Dextrose: 8.0
   Sodium Citrate (25% Solution): 2.83
   Salt: 1.80
   Thickening agent: 0.45
   Refined natural gum: 0.22
   Chervil: 0.14
   White Wine Flavor: 0.28
   Thyme: 0.07
   Basil: 0.07
   Preservative: 0.10.

13. A salad dressing made by the process of claim 11 and including a mixture of the following ingredients in percentage by weight:
   Water, Deionized: 63.595
   Vinegar, Cider 50 Grain: 25.00
   Dextrose: 4.00
   Sodium Citrate (25% Solution): 2.80
   Salt: 1.60
   Thickening agent: 0.45
   Refined natural gum: 0.22
   Oregano, Soluble: 0.07
   Garlic, Soluble: 1.30
   Parsley, Soluble: 0.16
   Soy Sauce: 0.48
   Red Pepper Granule: 0.07
   Garlic Dehydrated Mince: 0.07
   Parsley: 0.015
   Basil: 0.07
   Preservative: 0.10.

14. A salad dressing made by the process of claim 11 and including a mixture of the following ingredients in percentage by weight:
   Water, Deionized: 70.98
   Vinegar, White 100 Grain: 12.5
   Dextrose: 8.0
   Sodium Citrate (25% Solution): 2.8
   Salt: 1.6
   Thickening agent: 0.45
   Refined natural gum: 0.22
   Onion Powder: 1.12
   Onion Juice: 1.12
   Chive, Freeze Dried: 0.42
   Onion, Dehyrdated Mince: 0.42
   White Wine Flavor: 0.27
   Preservative: 0.10.

15. A salad dressing made by the process of claim 11 and including a mixture of the following ingredients in percentage by weight:
   Water, Deionized: 74.57
   Vinegar, White 100 Grain: 12.5
   Dextrose: 7.0
   Sodium Citrate (25% Solution): 2.83
   Salt: 1.80
   Thickening agent: 0.45
   Refined natural gum: 0.22
   Onion, Dehydrated Minced: 0.14
   Garlic, Dehydrated Minced: 0.06
   Pepper, Black Coarse: 0.03
   Parsley: 0.06
   Celery, Stalk Granule: 0.03
   Carrot Granule: 0.06
   Red Pepper Granule: 0.06
   Celery Flake: 0.06
   Tomato Flake: 0.03
   Preservative: 0.10.

16. A salad dressing made by the process of claim 11 and including a mixture of the following ingredients in percentage by weight:
   Water, Deionized: 73.59
   Vinegar, White 100 Grain: 12.50
   Dextrose: 7.00

Sodium Citrate (25% Solution): 3.00
Salt: 1.60
Thickening agent: 0.45
Refined natural gum: 0.22
Dill, Soluble: 0.70
Dill Weed: 0.14
Red Pepper, Granule: 0.07
Onion, Dehydrated Minced: 0.10
Parsley: 0.02
Garlic, Dehydrated Minced: 0.04
Lemon Juice Concentrate: 0.47
Preservative: 0.10.

17. A salad dressing made by the process of claim 11 and including a mixture of the following ingredients in percentage by weight:
Water Deionized: 69.62
Vinegar, White 100 Grain: 12.50
Dextrose: 10.00
Sodium Citrate (25% Solution): 2.83
Salt: 1.60
Thickening agent: 0.45
Refined natural gum: 0.22
Tarragon Soluble: 1.13
Tarragon: 0.06
Rosemary Soluble: 0.14
Onion, Dehydrated Minced: 0.07
Garlic, Dehydrated Minced: 0.03
Green Pepper Powder 1.25
Preservative: 0.10.

18. The method of claim 1 wherein the cooling of the mixture down to an ambient temperature is accomplished in approximately 1.5 hours.

19. The method of claim 1 comprising adding a preservative to the dry ingredients to effectively preclude bacterial growth within the prepared product.

20. The method of claim 19 wherein said preservative comprises sorbic acid.

21. A method for an edible uniform suspension of concentrated fruit or vegetable solids, including the following ingredients by weight percent:
Water: 63 to 75
Concentrated fruit or vegetable solids: 12 to 25
Thickening agent: 0.4 to 0.67,
wherein the method comprises:
combining the water with the concentrated solids,
thereafter heating the combination from ambient temperature up to approximately 190° F.,
gradually adding the thickening agent into the heating solution in a temperature range of between 120° F. to 160° F.,
simultaneously agitating the mixture while heating to prevent ingredient coagulation, and
thereafter cooling the mixture down to ambient temperature in approximately 1.5 hours, while simultaneously stirring the cooling mixture.

* * * * *

UNITED STATES PATENT AND TRADEMARK OFFICE
CERTIFICATE OF CORRECTION

PATENT NO. : 4,299,856

DATED : November 10, 1981

INVENTOR(S) : Richard Zirbel

It is certified that error appears in the above—identified patent and that said Letters Patent is hereby corrected as shown below:

Col. 4, line 35: after "(49°C)" change "." to --,--.

Col. 4, lines 37-39: delete "while agitating the mixture by a bottom disposed propeller in the solution container that upon rotation creates" and insert --while the solution is agitated by rotating a propeller disposed at the bottom of the solution container to create--.

Col. 5, line 34: delete "in duration has".

Col. 5, line 35: delete "in duration".

Col. 5, line 61: delete ";".

Col. 8, Example 9: change last line from:
"Sodium Citrate (25% Sol)     0.10"
to two lines:
--Sodium Citrate (25% Sol)    1.50
  Sorbic Acid                 0.10--.

Signed and Sealed this

Twenty-first Day of February 1984

[SEAL]

Attest:

GERALD J. MOSSINGHOFF

Attesting Officer

Commissioner of Patents and Trademarks